(12) United States Patent
Okamura et al.

(10) Patent No.: US 7,236,202 B2
(45) Date of Patent: Jun. 26, 2007

(54) MOVEMENT CONTROL SYSTEM AND METHOD

(75) Inventors: Shinichiro Okamura, Shijonawate (JP); Tetsuo Mise, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 819 days.

(21) Appl. No.: 10/681,188

(22) Filed: Oct. 9, 2003

(65) Prior Publication Data

US 2004/0078100 A1    Apr. 22, 2004

(30) Foreign Application Priority Data

Oct. 11, 2002    (JP)    ............... 2002-298151

(51) Int. Cl.
H04N 5/225    (2006.01)
H04N 5/238    (2006.01)

(52) U.S. Cl. ............... 348/374; 348/342; 348/361; 348/368

(58) Field of Classification Search ............... 348/374, 348/342, 368, 360, 361
See application file for complete search history.

(56) References Cited

U.S. PATENT DOCUMENTS 5,070,407 A * 12/1991 Wheeler et al. ............. 348/342
6,580,459 B2 * 6/2003 Uchino ....................... 348/342
7,079,186 B2 * 7/2006 Hashimoto .................. 348/342

FOREIGN PATENT DOCUMENTS

JP    7-199287    8/1995
JP    11-239356    8/1999
JP    2000-162665    6/2000

OTHER PUBLICATIONS

Patent Abstracts of Japan, Publication No. 7-199287, dated Aug. 4, 1995.
Patent Abstracts of Japan, Publication No. 2000-162665, dated Jun. 16, 2000./Discussed in the specification.
Patent Abstracts of Japan, Publication No. 11-239356, dated Aug. 31, 1999./Discussed in the specification.

* cited by examiner

Primary Examiner—Ngoc-Yen Vu
Assistant Examiner—Scott Egan
(74) Attorney, Agent, or Firm—Armstrong, Kratz, Quintos, Hanson & Brooks, LLP (57) ABSTRACT

A movement control system useful for an apparatus comprising a movable member movable between two positions, a motor and a sensor device for producing an output value which changes during the movement of the movable member. The control system drives the motor in a first amount so as to move the movable member from one of the two positions to the other position and thereafter drives the motor in a second amount to move the movable member toward said one position when the output value of the sensor device remains unchanged. When the sensor device produces a changed output value, the system drives the motor in a third amount to move the movable member toward said one position. Subsequently, the system drives the motor in a fourth amount when the output value of the sensor device is different from the output value before the motor is driven in the first amount, so as to move the movable member toward said other position. The system drives the motor in the second amount when the output values are the same so as to move the movable member toward said one position.

19 Claims, 6 Drawing Sheets

MOVEMENT CONTROL SYSTEM AND METHOD

FIELD OF THE INVENTION

The present invention relates to movement control systems and methods for use in moving a member between two positions.

BACKGROUND ART

It has been practice in various technical fields to move a member between two different positions when so required as is well known. Apparatus for moving a member between two different positions include, for example, surveillance or monitoring camera apparatus disclosed in the publications of JP-A No. 1999-239356 and JP-A No. 2000-162665. These monitoring camera apparatus comprise a CCD or like solid image pickup device and are adapted for use in a color mode or black-and-white mode. An infrared ray cutting-off filter is disposed or installed in position between the image pickup device and a condenser lens in the color mode. A dummy filter (dummy glass) is disposed between these components in the black-and-white mode. The infrared ray cutting-off filter and the dummy filter are fixedly mounted on a common member, which is moved by the operation of a motor and a slide mechanism for a changeover from one filter to the other.

Such an apparatus has the likelihood that the member fixedly provided with the filters will be stopped in the course of a movement when the load on the motor increases owing to the ingress of dust into the apparatus or when the torque of the motor reduces owing to an accident. Accordingly, widely performed is a control method comprising automatically judging whether the movement is faulty, i.e., whether the member is brought to the desired position, and driving the motor again based on the result of judgment to position the member reliably as desired. The member is detected using a sensor device, such as a microswitch or photointerrupter, for producing an output in the two patterns of Hi and Low. In the case of the monitoring camera apparatus described, it is desirable to provide the sensor device in each of two positions so as to reliably detect the infrared ray cutting-off filter or dummy filter as installed in the desired position. Stated more specifically, it is desired to provide a microswitch for contact with the member, with the infrared ray cutting-off filter disposed between the image pickup device and the condenser lens, and another microswitch for contact with the member, with the dummy filter disposed between these components.

With precision apparatus such as cameras, however, it is generally difficult to provide two sensor devices such as microswitches because of demands for compacted apparatus and the limitations involved in design. Although the publication of JP-A No. 2000-162665 discloses a monitoring camera apparatus wherein one photointerrupter is used as the sensor device for detecting the position of the member, it is not always possible to use the photointerrupter as in the case of the disclosed monitoring apparatus in view of the construction of the apparatus. In moving a member between two different positions, it is therefore desired to use only one sensor device, especially one sensor device of the contact type, for automatically detecting a faulty movement of the member to control the movement of the member to the desired position.

The present invention is intended to overcome the foregoing problems and to provide movement control system and method for controlling the movement of a member between two different positions by automatically detecting a faulty movement of the member with use of a single sensor device so as to move the member to the desired position.

SUMMARY OF THE INVENTION

The present invention provides a movement control system for an apparatus comprising a movable member movable between two different positions, a power generator for generating power for moving the movable member, and a sensor device for producing an output value changeable while the movable member moves between the two positions, the movement control system being operable to control the movement of the movable member between one of the two positions and the other position, the control system being operable to drive the power generator in a first amount enabling the movable member to reach the other position so as to move the movable member from said one position toward said other position, the control system being thereafter operable to drive the power generator in a second amount enabling the movable member to reach said one position when the output value of the sensor device remains unchanged, so as to move the movable member toward said one position, the control system being operable to drive the power generator in a third amount not enabling the movable member to reach said one position when the sensor device produces a changed output value, so as to move the movable member toward said one position, the control system being operable to drive the power generator in a fourth amount enabling the movable member to reach said other position after the power generator is driven in the third amount, when the output value of the sensor device is different from the output value before the power generator is driven in the first amount, so as to move the movable member toward said other position, the control system being operable to drive the power generator in the second amount when the output value of the sensor device is the same as the output value before the power generator is driven in the first amount, so as to move the movable member toward said one position.

The invention also provides a control method for an apparatus comprising a movable member movable between two different positions, a power generator for generating power for moving the movable member, and a sensor device for producing an output value changeable while the movable member moves between the two positions, the control method being adapted to control the movement of the movable member between one of the two positions and the other position, the control method including: the first step of driving the power generator in a first amount enabling the movable member to reach said other position so as to move the movable member from said one position toward said other position; the second step of thereafter driving the power generator in a second amount enabling the movable member to reach said one position when the output value of the sensor device remains unchanged, so as to move the movable member toward said one position, and driving the power generator in a third amount not enabling the movable member to reach said one position when the sensor device produces a changed output value, so as to move the movable member toward said one position; and the third step of subsequently driving the power generator in a fourth amount enabling the movable member to reach said other position when the output value of the sensor device is different from the output value before the first step, so as to move the movable member toward said other position, and driving the power generator in the second amount when the output value of the sensor device is the same as the output value before the first step, so as to move the movable member toward said one position.

In the above movement control system and control method, the control operation may be performed by driving the power generator in an amount enabling the movable member to reach the other position so as to move the movable member from said one position toward the other position, and thereafter driving the power generator in an amount not enabling the movable member to reach said one position so as to move the movable member toward said one position, without checking the output value of the sensor device.

Further with the movement control system and the control method described, the power generator is a stepping motor, and the amount of driving may be determined in terms of the number of pulses to be fed to the stepping motor. Further with the movement control system and the control method described, the power generator is a D.C. motor, and the amount of driving may be determined in terms of the duration of application of voltage to the D.C. motor.

In moving the movable member from a position A to a position B according to the invention, the power generator is first driven in an amount enabling the movable member to reach the position B so as to move the movable member from the position A toward the position B. The sensor device changes its output value while the movable member moves between the position A and the position B, so that if the output value of the sensor device remains unchanged after the power generator is driven, this can be interpreted as indicating that the movable member has not reached the position B. Accordingly, the power generator is driven so as to return the movable member to the position A.

In the case where the output value of the sensor device changes after the power generator is driven, the power generator is driven in an amount not enabling the movable member to reach the position A so as to move the movable member toward the position A. Thus, the system effects processing to move the movable member a small distance toward the position A. If the processing for this movement changes the output value of the sensor device (if the output value of the sensor device after the processing is the same as the output value available when the movable member is at the position A), this can be interpreted as indicating that the first movement failed to bring the movable member to the position B, and that the movable member is currently located toward the position A based on a position C where the sensor output changes. The power generator is therefore driven so as to return the movable member to the position A. Alternatively, if the processing for the movement produced no change in the output value of the sensor device (if the output value of the sensor device after the processing differs from the output value available when the movable member is at the position A), this can be interpreted as indicating that the movable member is located toward the position B based on the position C. The power generator is driven so as to cause the movable member to reach the position B.

Thus, the present invention provides a control system and a control method for an apparatus wherein a movable member is moved between two different positions, to control the movement of the member to the desired position by automatically judging whether the movement of the member is faulty using a single sensor device, especially a sensor device of the contact type. In the event of a faulty movement occurring, the movable member is returned to the initial position (position A), and the movable member is moved again from the beginning. The movable member is therefore movable with a very high frequency. In view of a case wherein the faulty movement remains uncorrected despite repetitions of the movement, it is desirable to complete the movement of the movable member when the number of times the movable member is returned to the initial position has reached a predetermined value.

The same advantage as above is available by driving the power generator first in an amount enabling the movable member to reach the position A, and thereafter driving the power generator in an amount not enabling the movable member to reach the position A so as to move the movable member toward the position A, without checking the output value of the sensor device.

With camera apparatus, it is likely that the number and the kind of sensor devices usable for controlling the changeover of the filter from one to the other will be restricted because of demands for compacted apparatus and limitations involved in design. Fulfilling such demands and over coming these limitations, the present invention realizes changeover control for the filters with high reliability for use in camera apparatus.

DETAILED DESCRIPTION OF THE INVENTION

Figure 1:
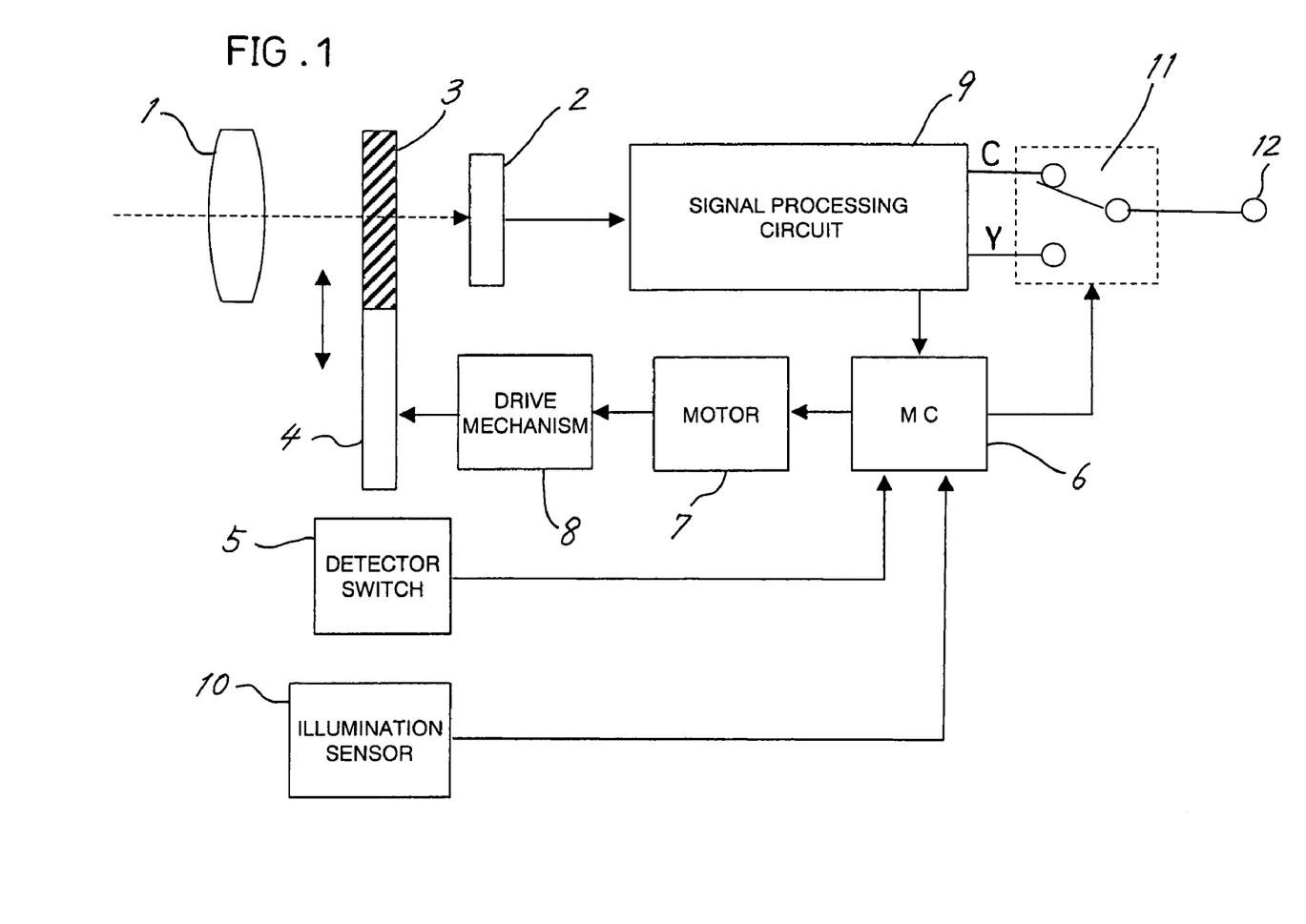
FIG. 1 is a block diagram of a monitoring camera apparatus embodying the invention.

An embodiment of the present invention will be described below with reference to the drawings. FIG. 1 is a block diagram of a monitoring camera apparatus wherein a movement control system of the invention is used. The light emanating from a subject is converged by a lens 1 and thereafter impinges on a solid image pickup device 2, by which the light is converted to an electric signal. Selectively disposed between the lens 1 and the image pickup device 2 is one of an infrared ray cutting-off filter 3 and a dummy filter 4. In the case where the monitoring camera apparatus is used in a color mode (i.e., in the case where the camera apparatus outputs a color image signal), the infrared ray cutting-off filter 3 is mounted in position to cut out the rays in the infrared region and to prevent images from becoming reddish. In the case where the camera apparatus is used in the black-and-white mode (i.e., in the case where the camera apparatus outputs a black-and-white image signal), the dummy filter 4 is installed in position. Since the dummy filter 4 passes incident light without cutting out the light in the infrared region, the monitoring camera apparatus produces sharp images in the black-and-white mode even at a low intensity of illumination as in the nighttime. The dummy filter 4 also serves to provide in the black-and-white mode an optical path length equal to that available when the infrared ray cutting-off filter 3 is positioned in place.

Both the infrared ray cutting-off filter 3 and the dummy filter 4 are mounted on a movable member in the form of a plate. One of the filters is changed over to the other by pivotally moving the movable member about an axis parallel to the optical path. A detector switch 5 serving as a sensor device is a contact switch, and a pusher member for the switch 5 is movable toward or away from the pivotally movable member. The detector switch 5 delivers a signal of 0 V (Low signal) to a control microcomputer (hereinafter referred to as the "MC") 6 while the pusher member is not pushed, or delivers a signal of 5 V (Hi signal) to the MC 6 while the pusher member is held depressed by contact with the movable member. A motor 7 is coupled to the movable member by a drive mechanism 8 for transmitting the torque of the motor 7 to the movable member, and has its operation controlled by the MC 6. The movement control system of the invention is realized by the execution of the processing program to be described below by the MC 6. This program is stored in a ROM (not shown) incorporated in the MC 6.

A signal processing circuit 9 produces a color image signal C or black-and-white image signal Y from the electric signal delivered from the solid image pickup device 2. The MC 6 drives the motor 7 based on an illumination signal sent from an illumination sensor 10 and corresponding to the brightness outside the apparatus to cause a changeover from one of the filters 3, 4 to the other. The MC 6 further moves a changeover switch 11 based on the illumination signal to change over the output of the camera apparatus from the color image signal C to the black-and-white image signal Y, and vice versa. The image signal delivered from the output terminal 12 of the monitoring camera apparatus is fed to a CRT or like display device or recorded on a HD or like recording medium.

Figure 2:
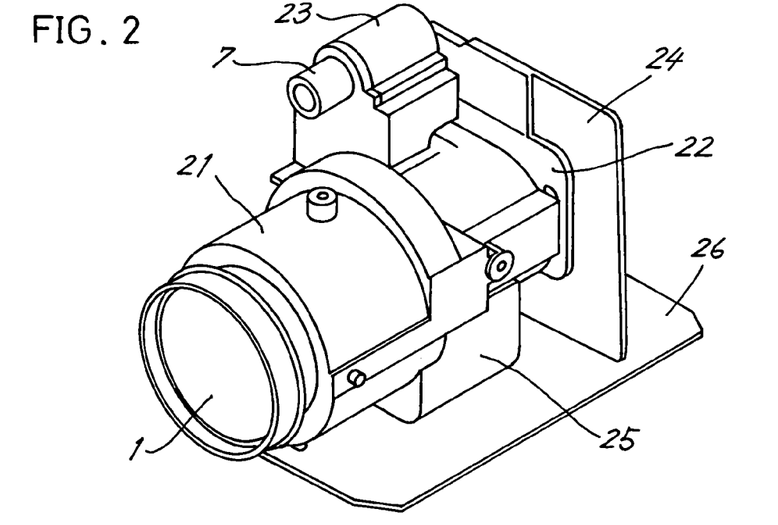
FIG. 2 is a perspective view of the monitoring camera apparatus embodying the invention.

FIG. 2 is a perspective view of the monitoring camera apparatus according to the present embodiment. The camera apparatus has a substantially cylindrical lens barrel 21 provided with the lens 1 at its one end. A plate member 22 having the solid image pickup device 2 (not shown) fixed thereto is attached to the other end of the lens barrel 21, with the device 2 disposed inside the barrel 21. A housing 23 enclosing a portion of the drive mechanism 8 is mounted on an outer wall of the lens barrel 21 as shown at the left upper part of the drawing. The motor 7 is fixed to a side portion of the housing 23. Attached to the rear side of the plate member 22 is a board 24 provided with the MC 6, the signal processing circuit 9, and the like (not shown). The lens barrel 21 is joined to a base 25, and a stabilizing plate 26 is joined to the bottom side of the base 25.

Figure 3:
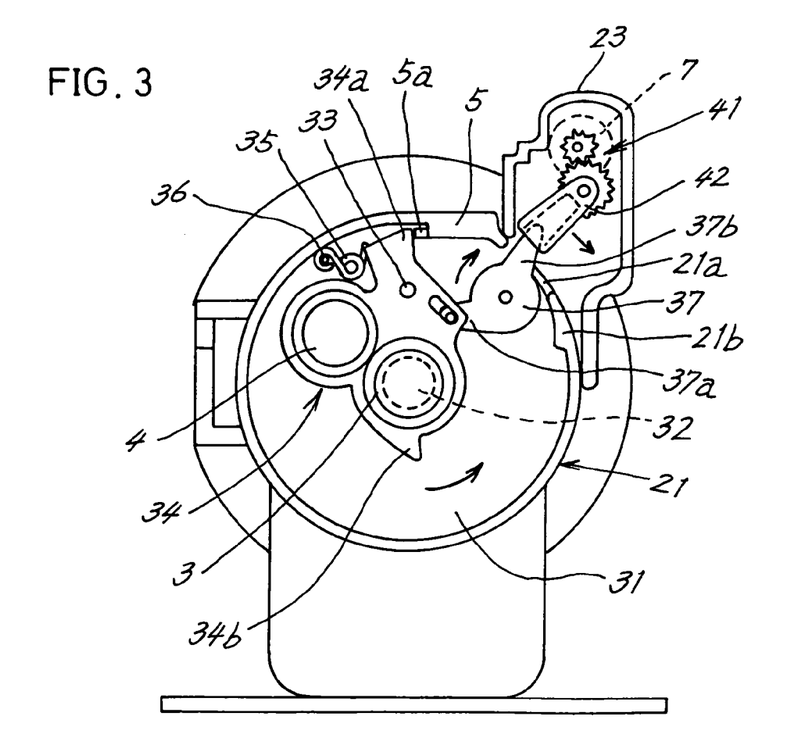
FIG. 3 is a rear view of the monitoring camera apparatus in a color mode.
Figure 4:
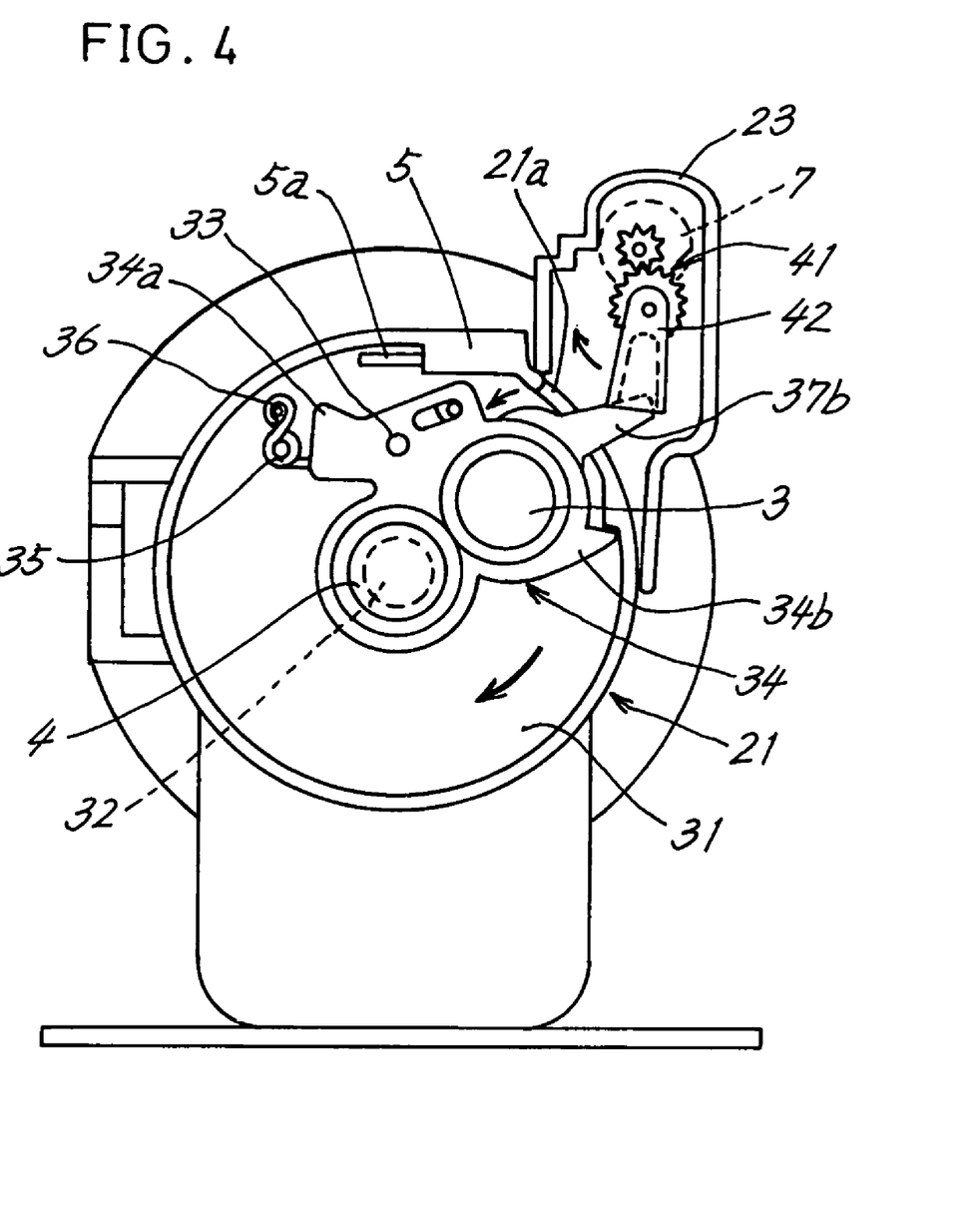
FIG. 4 is a rear view of the monitoring camera apparatus in a black-and-white mode.

FIGS. 3 and 4 are rear views of the camera apparatus, with the board 24 and also the plate member 22 removed. The camera apparatus is shown in the color mode in FIG. 3, and in the black-and-white mode in FIG. 4. A wall 31 is formed on the rear end side of the lens barrel 21. An opening 32 is formed in the center of the wall 31 for passing therethrough the light converged by the lens 1. Positioned above the opening 32 is a pivot member 33 projecting from the wall 31. The movable member 34 fixedly provided with the infrared ray cutting-off filter 33 and the dummy filter 4 which are each in the form of a disk is pivotally movably supported by the pivot member 33. As shown in FIG. 3, the filter 3 is so disposed as to cover the opening 32 in the color mode.

In the color mode, the movable member 34 is biased by a torsion spring 35 in a clockwise direction as shown in FIG. 3. The torsion spring 35 has one end wound around a pin 36 projecting from the wall 31 and the other end wound around a pin (not shown) projecting from the rear side of an end portion of the movable member 34. The movable member 34 is restrained from moving clockwise by the detector switch 5. The pusher member, indicated at 5a, of the switch 5 is disposed on a right upper portion of the wall 31 and pointed toward the counterclockwise direction. The movable member 34 has a first pawl 34a formed on an edge portion thereof and bearing on the pusher member 5a to press the member 5a toward the clockwise direction. With the pusher member 5a brought to a lower limit position of a stroke, the movable member 34 is positioned in place in the color mode (with the infrared ray cutting-off filter 3 mounted in position).

On the right side of the movable member 34, a lever member 37 constituting the drive mechanism 8 is pivotally supported on the wall 31. The lever member 37 has two arms 37a, 37b. A pin projecting from an outer end of the arm 37a is inserted from the rear side of the movable member 34 in a slit formed in a right upper portion of the movable member 34. The other arm 37b extends outward through a recess 21a formed in an end portion of the lens barrel 21 and is connected to a reduction gear unit 41 providing the drive mechanism 8. The reduction gear unit 41 comprises rotating shafts and gears and is coupled to the motor 7. The gear remotest from the motor has joined thereto a connecting member 42 having a grooved portion formed in the rear side thereof, with the arm 37b fitted therein. The groove portion has an open end toward the arm 37b, and the outer end of the arm 37b is given suitable play as fitted in the grooved portion. This arrangement pivotally moves the arm 37b, i.e., the lever member 37, when the connecting member 42 is driven.

When the motor 7 is driven to rotate the connecting member 42 counterclockwise from the state shown in FIG. 3, the lever member 37 rotates clockwise, further rotating the movable member 34 counterclockwise against the biasing force of the torsion spring 35. The component in the rotating direction of the biasing force of the torsion spring 35 changes its direction from the clockwise to the counterclockwise at a certain turning point (at a position where the biasing force is directed toward the pivot member 33 of the movable member 34). With the movement of the movable member 34, the pusher member 5a of the detector switch 5 advances leftward. Upon the pusher member 5a reaching an upper limit position of the stroke, the first pawl 34a moves away from the pusher member 5a, whereupon the voltage of the signal delivered from the detector switch 5 changes from Hi to Low.

The movable member 34 has a second pawl 34b on the opposite side to the first pawl 34a. An inner wall of the lens barrel 21 has a stopper 21b for restraining the movable member 34 from moving counterclockwise. As the movable member 34 is rotated counterclockwise, the movable member 34 stops upon the second pawl 34b reaching the stopper 21b. The member 34 is positioned in place in the black-and-white mode (with the dummy filter 4 installed in position) as seen in FIG. 4.

With the monitoring camera apparatus of the invention having the construction described above, the movable member 34 is suitably moved between the position shown in FIG. 3 for the color mode and the position shown in FIG. 4 for the black-and-white mode. When dust or like extraneous matter ingresses into the housing 23 to interfere with the movement of the reduction gear unit 41, or in the event of an accident such as failure of the motor 7 to act against the biasing force of the torsion spring 35 due to a reduction in torque, the movable member 34 will be halted during movement, whereas the movable member 34 is movable completely with considerably high reliability according to the invention, positioning the infrared ray cutting-off filter 3 or dummy filter 4 in place.

A description will be given below of a procedure for controlling the movement of the movable member 34 according to the invention. For the sake of simplicity, the position of the movable member 34 in the color mode shown in FIG. 3 will be referred to as "position A," and the position of the movable member 34 in the black-and-white mode shown in FIG. 4 as "position B."

The control procedure will be described with reference to a case wherein the movable member 34 is moved from position A (wherein the infrared ray cutting-off filter 3 is installed in place) to position B (where the dummy filter 4 is installed in place), i.e., a control procedure for changing over the filter in position from the filter 3 to the dummy filter 4. The control procedure for moving the member 34 from position B to position A will be readily understood by replacing the positions A and B by each other in the following description.

Figure 5:
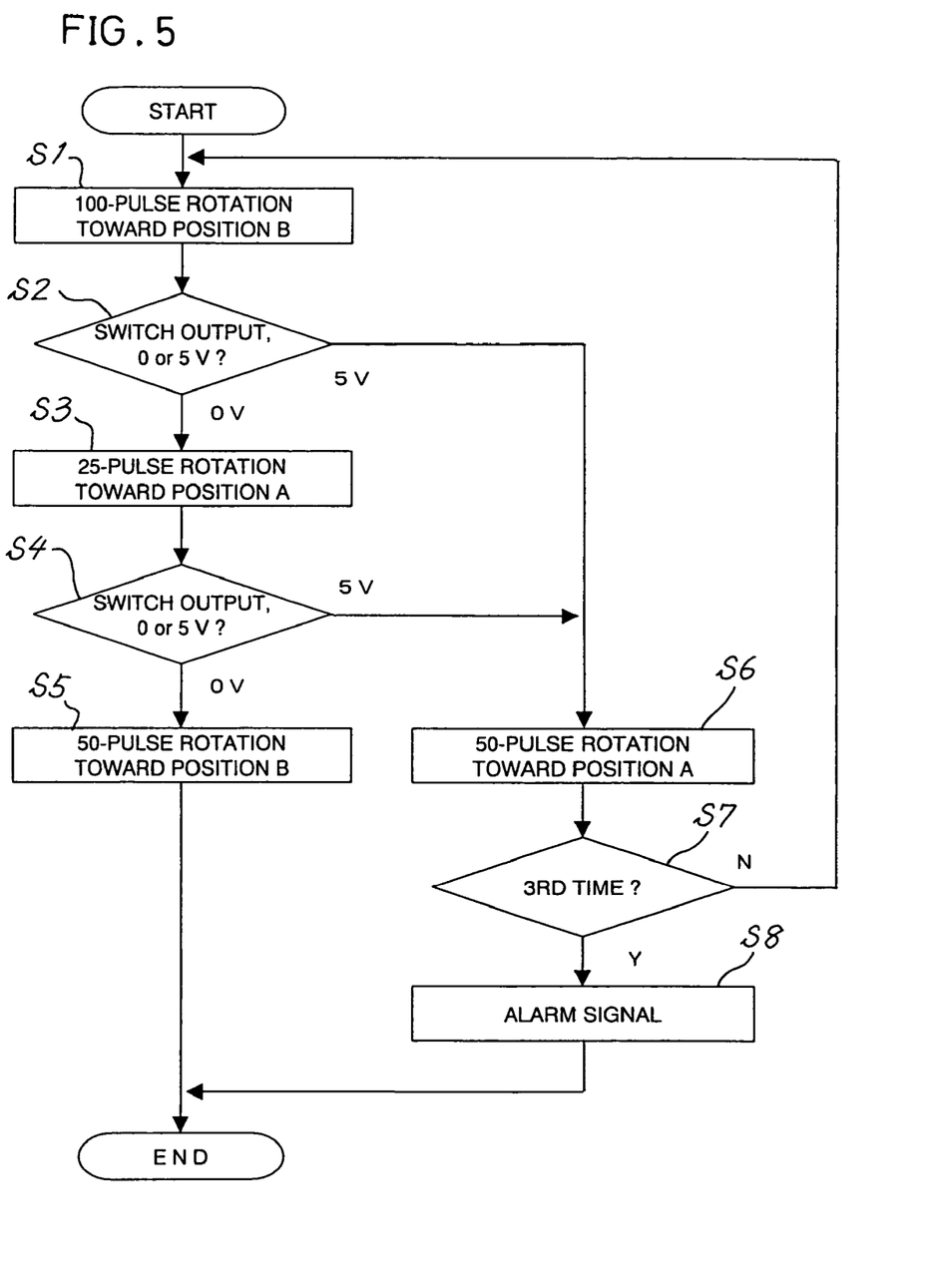
FIG. 5 is a flow chart of a procedure for controlling the movement of a movable member according to the invention.

FIG. 5 is a flow chart showing the control procedure for moving the movable member 34 according to the invention. The motor 7 used in the present embodiment is a stepping motor. When a control operation is started, the MC 6 feeds a predetermined number of pulses to the motor 7, which in turn rotates so as to move the movable member 34 from position A to position B (S1). According to the embodiment, the MC 6 feeds a signal of 100 pulses to the motor 7. The number of pulses (100) for use in step S1 is so determined as to slightly exceed a number of pulses (e.g., 80 pulses) needed for ideally moving the movable member 34 from position A to position B. In the usual case, step S1 moves the movable member 34 from position A to position B.

On completion of rotation of the motor 7, the MC 6 checks whether the output of the switch 5 is 0 V (Low) or 5 V (Hi)(S2). In moving the movable member 34 from position A to position B, at the position (hereinafter referred to as "position C") of a turning point where the first pawl 34a leaves the pusher member 4a of the switch 5, the output of the switch 5 changes from 5 V to 0 V. In step S2, therefore, an inquiry is made as to whether the movable member 34 is positioned toward position A or toward position B with reference to position C. Preferably, position C is set approximately at the middle between positions A and B as in the present embodiment.

If the output of the switch 5 is found to be 0 V in step S2, the MC 6 rotates the motor 7 in the opposite direction to step S1 by an amount corresponding to a suitable number of pulses to move the movable member 34 toward position A (S3). Step S3 is intended to slightly move the movable member 34 toward the opposite direction (namely, toward position A), and the number of pulses is so determined that the movable member 34 will not reach position A even if moved ideally. The number of pulses for use in step S3 is set at 25.

Step S3 is followed by step S4 wherein an inquiry is made as to whether the output of the switch 5 is 0 V or 5 V as in step S2. If the output of the switch 5 is found to be 0 V, that is, if the movable member 34 is located toward position B with reference to position C, the MC 6 gives a command to rotate the motor 7 with a suitable number of pulses, moving the movable member 34 toward position B (S5).

Since step S5 is intended to bring the movable member 34 to position B, the number of pulses for use in step S5 must be at least a value enabling the movable member 34 to move from position C to position B in an ideal case. Accordingly, it is desired to determine the pulse number for step S5 by multiplying the ratio of the angle of rotation of the movable member 34 for the movement from position C to position B to the angle of rotation of the movable member 34 for the movement from position A to position B by the pulse number in step S1. According to the embodiment, the pulse number is set at 50 which is one-half the pulse number (100) of step S1. The completion of step S5 brings the movable member 34 to position B, whereby the control operation for the movement is completed.

When the output of the switch 5 is found to be 5 V in step S2 or step S4, that is, when the movable member 34 is found located toward the position A with reference to position C, the MC 6 rotates the motor 7 with a predetermined number of pulses to move the movable member 34 toward position A (S6).

The purpose of step S6 is to return the movable member 34 to position A, and the number of pulses for use in step S6 must be at least a value enabling the movable member 34 to move from position C to position A in an ideal case. Accordingly, it is desired to determine the pulse number by multiplying the ratio of the angle of rotation of the movable member 34 for the movement from position C to position A to the angle of rotation of the movable member 34 for the movement from position A to position B by the pulse number of step S1. According to the embodiment, the pulse number is set at 50 which is one-half the pulse number (100) of step S1. The completion of step S6 brings the movable member 34 to position A. Since position C is approximately at the middle between position A and position B in the embodiment, the pulse number of step S5 and that of step S6 are set at the same value, but the pulse numbers need not always be so determined.

When the movable member 34 is brought to position A, the procedure of step S1 and the following is performed again. In the case where the impediment to the movement of the member 34 to position B is not eliminated, step S6 is likely to be repeated endlessly. To preclude this, an inquiry is made after the completion of step S6 as to whether the number of times the step S6 is repeated has reached a predetermined number (S7). According to the embodiment, step S7 inquires whether step S6 has been performed three times. If step S6 has been performed once or twice, the procedure of step S1 and the following is performed. When the number of times step S6 is repeated is three, the MC 6 produces an alarm signal, giving notice to an abnormal situation (S8) to complete the movement control operation. The alarm signal is sent to a warning lamp or a display such as an LCD (not shown) connected to the camera apparatus to attract the attention of the user.

Figure 6:
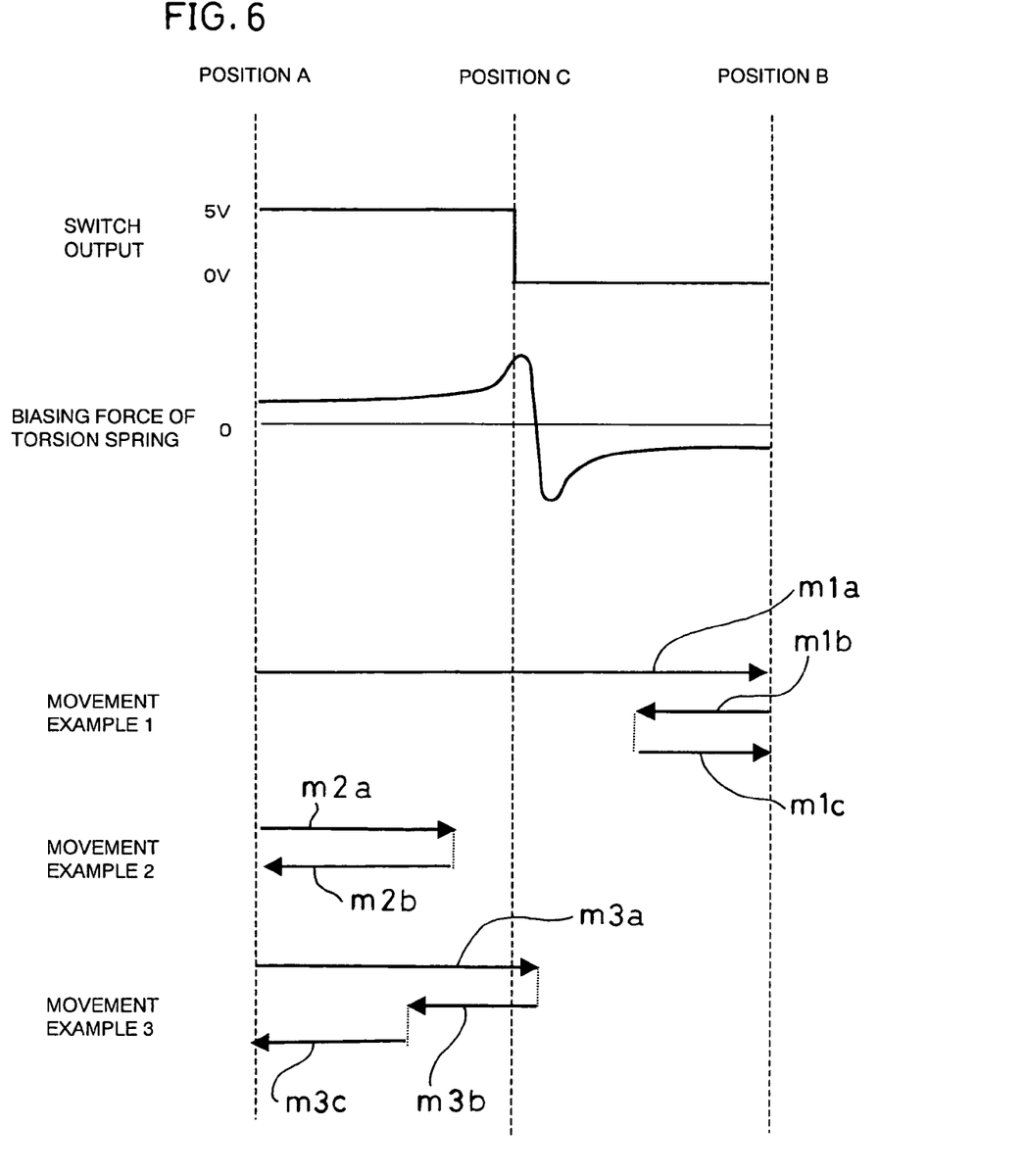
FIG. 6 is a diagram for illustrating examples of movements of the movable member of the invention.

FIG. 6 is a diagram for illustrating examples of movements of the movable member 34 as controlled by the above procedure. The diagram shows a change in the output of the switch 5 along with a component in the rotating direction (positive direction is toward position B) of the biasing force of the torsion spring 35. Movement Example 1 shows a normal movement of the movable member 34 which is usually conducted under the control of the system of the invention. Unless a particular accident occurs, step S1 brings the movable member 34 from position A to position B (m1a). The motor 7 is reversely rotated with 25 pulses subsequently in step S3, whereby the movable member 34 is returned toward position A (m1b). Further in step S5, the motor 7 is rotated positively with 50 pulses, whereby the movable member 34 is moved toward position B and brought to position B again (m1c). Since pulses are fed to the motor 7 to excess in step S1 or S5, the motor 7 comes to a halt after misstepping upon the movable member 34 reaching position B.

In the case where the movable member fails to reach position B in step S1, step S5 brings the member 34 to position B as in Movement Example 1 if the output of the switch 5 is found to be 0 V in step S2 and step S4 (if the movable member 34 is located toward position B based on position C).

In the case where the output of the switch 5 is found to be 5 V in step S2 or S4, the movable member 34 fails to reach position B in step S1. Movement Example 2 is a case wherein the output of the switch 5 is found to be 5 V in step S2. Step S1 rotates the motor 7 in the positive direction in an amount corresponding to 100 pulses, moving the movable member 34 from position A toward position B, but the member 34 stops before reaching position C (m2a). Such a situation occurs, for example, in the event of the motor 7 misstepping, when the torque of the motor 7 reduces owing to an accident although the biasing force of the torsion spring 35 increases with the movement of the movable member 34. After steps S1 and S2, the motor 7 rotates in the reverse direction in an amount corresponding to 50 pulses in step S6, whereby the movable member 34 is returned to position A (m2b). When step S6 brings the movable member 34 to position A, the motor 7 stops after misstepping since an excessive number of pulses are fed to the motor (as is the case with m3c to be described below). The procedure of step S1 and the following steps is thereafter performed again in an attempt to move the movable member 34 from position A to position B.

Movement Example 3 is a case wherein the motor 7 missteps during the movement of the movable member 34 in step S1, bringing the member 34 to a halt in the vicinity of position C toward position B. In this case, step S3 is performed (after steps S1 and S2) to move the movable member 34 toward position A (m3b). The output of the switch 5 is found to be 5 V in step S4, indicating that step S1 (m3a) fails to bring the member 34 to position B. Step S6 rotates the motor 7 in the reverse direction in an amount corresponding to 50 pulses, returning the movable member 34 to position A (m3c). The procedure of step S1 and the following is thereafter performed in an attempt to move the movable member 34 from position A to position B.

Figure 7:
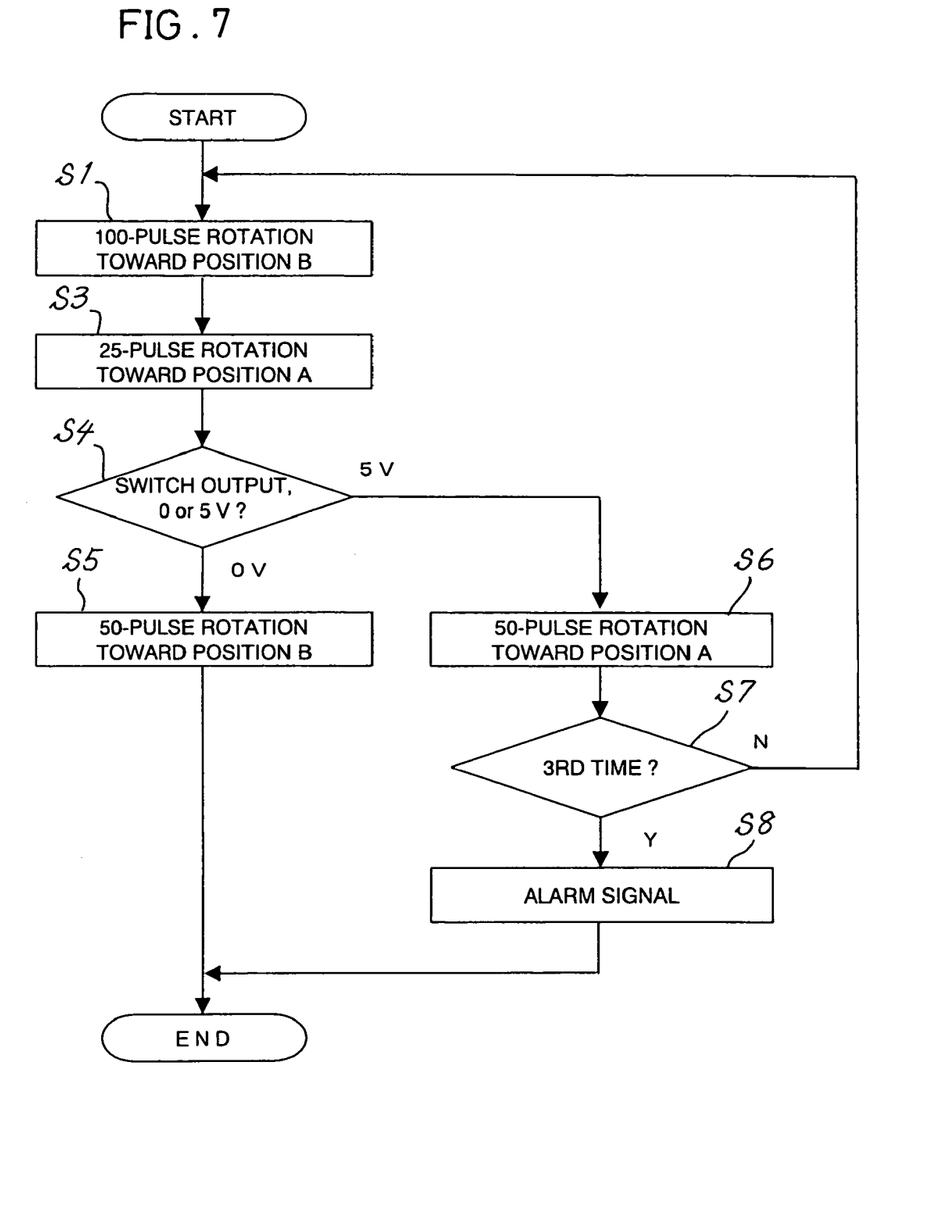
FIG. 7 is a flow chart of another procedure for controlling the movement of the movable member according to the invention.

FIG. 7 is a flow chart of a second embodiment of movement control procedure of the invention, which differs from the procedure of the flow chart of FIG. 5 in that step S2 is removed. Step S2 is a step intended to quickly handle a case wherein the movable member 34 fails to reach even position C after step S1. When such a case is almost unlikely to be encountered, the control procedure of FIG. 7 may be performed. The case can be handled even by the control procedure of FIG. 7 without any problem.

Although the present invention is applied to a monitoring camera apparatus according to the foregoing embodiments, the invention is useful also for camera apparatus, other than monitoring camera apparatus, wherein one of two filters is selectively used. Apparently, the invention is applicable also to apparatus, other than camera apparatus, wherein a member is moved between two different positions. Although a stepping motor is used as the power generator in the foregoing embodiments, a D.C. motor may alternatively be used. In this case, the pulse number referred to in the above description is replaced by the duration of application of voltage to the D.C. motor. Incidentally, the power generator for use in the present invention is not limited only to a motor but can be an actuator wherein a solenoid coil is used.

Although the contact switch 5 is used in the embodiments, any sensor device is usable in the invention insofar as the device produces such an output as shown in FIG. 6 with a change in position.

The embodiments described above are intended to illustrate the present invention and should not be construed as limiting the invention set forth in the appended claims or reducing the scope thereof. The apparatus of the invention is not limited to the foregoing embodiments in construction but can of course be modified variously within the technical scope set forth in the claims.

FIG. 1
5: detector switch
10: illumination sensor
8: drive mechanism
7: motor
6: MC
9: signal processing circuit
FIG. 5
S1: 100-pulse rotation toward position B
S2: switch output, 0 or 5 V?
S3: 25-pulse rotation toward position A
S5: 50-pulse rotation toward position B
S6: 50-pulse rotation toward position A
S7: 3rd time?
S8: alarm signal
FIG. 6
position A, C, B
switch output
biasing force of torsion spring
movement example 1

What is claimed is:

1. A movement control system for an apparatus comprising a movable member movable between two different positions, a power generator for generating power for moving the movable member, and a sensor device for producing an output value changeable while the movable member moves between the two positions, the movement control system being operable to control the movement of the movable member between one of the two positions and the other position, the control system being operable to drive the power generator in a first amount enabling the movable member to reach the other position so as to move the movable member from said one position toward said other position, the control system being thereafter operable to drive the power generator in a second amount enabling the movable member to reach said one position when the output value of the sensor device remains unchanged, so as to move the movable member toward said one position, the control system being operable to drive the power generator in a third amount not enabling the movable member to reach said one position when the sensor device produces a changed output value, so as to move the movable member toward said one position, the control system being operable to drive the power generator in a fourth amount enabling the movable member to reach said other position after the power generator is driven in the third amount, when the output value of the sensor device is different from the output value before the power generator is driven in the first amount, so as to move the movable member toward said other position, the control system being operable to drive the power generator in the second amount when the output value of the sensor device is the same as the output value before the power generator is driven in the first amount, so as to move the movable member toward said one position.

2. A movement control system according to claim 1 wherein the power generator is a stepping motor, and the first to fourth amounts of driving are determined in accordance with the number of pulses to be given to the stepping motor.

3. A movement control system according to claim 1 wherein the power generator is a D.C. motor, and the first to fourth amounts of driving are determined in accordance with the duration of application of voltage to the D.C. motor.

4. A movement control system for an apparatus comprising a movable member movable between two different positions, a power generator for generating power for moving the movable member, and a sensor device for producing an output value changeable while the movable member moves between the two positions, the movement control system being operable to control the movement of the movable member between one of the two positions and the other position, the control system being operable to drive the power generator in a first amount enabling the movable member to reach the other position so as to move the movable member from said one position toward said other position, the control system being thereafter operable to drive the power generator in a second amount not enabling the movable member to reach said one position, so as to move the movable member toward said one position, the control system being operable to drive the power generator in a third amount enabling the movable member to reach said other position after the power generator is driven in the second amount, when the output value of the sensor device is different from the output value before the power generator is driven in the first amount, so as to move the movable member toward said other position, the control system being operable to drive the power generator in a fourth amount enabling the movable member to reach said one position when the output value of the sensor device is the same as the output value before the power generator is driven in the first amount, so as to move the movable member toward said one position.

5. A movement control system according to claim 4 wherein the power generator is a stepping motor, and the first to fourth amounts of driving are determined in accordance with the number of pulses to be given to the stepping motor.

6. A movement control system according to claim 4 wherein the power generator is a D.C. motor, and the first to fourth amounts of driving are determined in accordance with the duration of application of voltage to the D.C. motor.

7. A camera apparatus comprising a movable member having fixed thereto two filters one of which is selectably installed in position between a lens and a solid image pickup device, a power generator for generating power for moving the movable member, a sensor device for producing an output value changeable while the movable member moves between two filter installation positions, and a control system for controlling the movement of the movable member between a first installation position where one of the filters is installed in position and a second installation position where the other filter is installed in position, the control system being operable to drive the power generator in a first amount enabling the movable member to reach the second installation position so as to move the movable member from the first installation position toward the second installation position, the control system being thereafter operable to drive the power generator in a second amount enabling the movable member to reach the first installation position when the output value of the sensor device remains unchanged, so as to move the movable member toward the first installation position, the control system being operable to drive the power generator in a third amount not enabling the movable member to reach the first installation position when the sensor device produces a changed output value, so as to move the movable member toward the first installation position, the control system being operable to drive the power generator in a fourth amount enabling the movable member to reach the second installation position after the power generator is driven in the third amount, when the output value of the sensor device is different from the output value before the power generator is driven in the first amount, so as to move the movable member toward the second installation position, the control system being operable to drive the power generator in the second amount when the output value of the sensor device is the same as the output value before the power generator is driven in the first amount, so as to move the movable member toward the first installation position.

8. A camera apparatus according to claim 7 wherein the power generator is a stepping motor, and the first to fourth amounts of driving are determined in accordance with the number of pulses to be given to the stepping motor.

9. A camera apparatus according to claim 7 wherein the power generator is a D.C. motor, and the first to fourth amounts of driving are determined in accordance with the duration of application of voltage to the D.C. motor.

10. A camera apparatus comprising a movable member having fixed thereto two filters one of which is selectably installed in position between a lens and a solid image pickup device, a power generator for generating power for moving the movable member, a sensor device for producing an output value changeable while the movable member moves between two filter installation positions, and a control system for controlling the movement of the movable member between a first installation position where one of the filters is installed in position and a second installation position where the other filter is installed in position, the control system being operable to drive the power generator in a first amount enabling the movable member to reach the second installation position so as to move the movable member from the first installation position toward the second installation position, the control system being thereafter operable to drive the power generator in a second amount not enabling the movable member to reach the first installation position, so as to move the movable member toward the first installation position, the control system being operable to drive the power generator in a third amount enabling the movable member to reach the second installation position after the power generator is driven in the second amount, when the output value of the sensor device is different from the output value before the power generator is driven in the first amount, so as to move the movable member toward the second installation position, the control system being operable to drive the power generator in a fourth amount enabling the movable member to reach the first installation position when the output value of the sensor device is the same as the output value before the power generator is driven in the first amount, so as to move the movable member toward the first installation position.

11. A camera apparatus according to claim 10 wherein the power generator is a stepping motor, and the first to fourth amounts of driving are determined in accordance with the number of pulses to be given to the stepping motor.

12. A camera apparatus according to claim 10 wherein the power generator is a D.C. motor, and the first to fourth amounts of driving are determined in accordance with the duration of application of voltage to the D.C. motor.

13. A control method for an apparatus comprising a movable member movable between two different positions, a power generator for generating power for moving the movable member, and a sensor device for producing an output value changeable while the movable member moves between the two positions, the control method being adapted to control the movement of the movable member between one of the two positions and the other position, the control method including:

the first step of driving the power generator in a first amount enabling the movable member to reach said other position so as to move the movable member from said one position toward said other position, the second step of thereafter driving the power generator in a second amount enabling the movable member to reach said one position when the output value of the sensor device remains unchanged, so as to move the movable member toward said one position, and driving the power generator in a third amount not enabling the movable member to reach said one position when the sensor device produces a changed output value, so as to move the movable member toward said one position, and the third step of subsequently driving the power generator in a fourth amount enabling the movable member to reach said other position when the output value of the sensor device is different from the output value before the first step, so as to move the movable member toward said other position, and driving the power generator in the second amount when the output value of the sensor device is the same as the output value before the first step, so as to move the movable member toward said one position.

14. A control method according to claim 13 wherein the power generator is a stepping motor, and the first to fourth amounts of driving are determined in accordance with the number of pulses to be given to the stepping motor.

15. A control method according to claim 13 wherein the power generator is a D.C. motor, and the first to fourth amounts of driving are determined in accordance with the duration of application of voltage to the D.C. motor.

16. A control method for an apparatus comprising a movable member movable between two different positions, a power generator for generating power for moving the movable member, and a sensor device for producing an output value changeable while the movable member moves between the two positions, the control method being adapted to control the movement of the movable member between one of the two positions and the other position, the control method including:

the first step of driving the power generator in a first amount enabling the movable member to reach said other position so as to move the movable member from said one position toward said other position, the second step of thereafter driving the power generator in a second amount not enabling the movable member to reach said one position so as to move the movable member toward said one position, and the third step of subsequently driving the power generator in a third amount enabling the movable member to reach said other position when the output value of the sensor device is different from the output value before the first step, so as to move the movable member toward said other position, and driving the power generator in a fourth amount enabling the movable member to reach said one position when the output value of the sensor device is the same as the output value before the first step, so as to move the movable member toward said one position.

17. A control method according to claim 16 wherein the power generator is a stepping motor, and the first to fourth amounts of driving are determined in accordance with the number of pulses to be given to the stepping motor.

18. A control method according to claim 16 wherein the power generator is a D.C. motor, and the first to fourth amounts of driving are determined in accordance with the duration of application of voltage to the D.C. motor.

19. A control method according to claim 16 wherein the apparatus is a camera apparatus, the movable member having fixed thereto two filters one of which is selectably installed in position between a lens and a solid image pickup device, and the sensor device produces an output value which changes while the movable member moves between two filter installation positions.

* * * * *